United States Patent

Berry

[11] Patent Number: 5,835,289
[45] Date of Patent: Nov. 10, 1998

[54] AUXILIARY LENS ATTACHMENT FOR AN OPTICAL DEVICE

[76] Inventor: James M. Berry, 2349 Bluebonnet, Houston, Tex. 77030-3624

[21] Appl. No.: 779,576

[22] Filed: Jan. 7, 1997

[51] Int. Cl.$^6$ ................................................. G02B 7/02
[52] U.S. Cl. ............................................................ 359/822
[58] Field of Search .................................. 359/819, 822, 359/827, 829, 643, 646

[56] References Cited

U.S. PATENT DOCUMENTS

| | | | |
|---|---|---|---|
| 1,508,043 | 9/1924 | Barrows | 351/158 |
| 4,119,984 | 10/1978 | Zajac | 396/373 |
| 4,172,662 | 10/1979 | Vogel | 356/248 |
| 4,251,127 | 2/1981 | Yamaguchi | 359/504 |
| 4,936,667 | 6/1990 | Rohr et al. | 359/480 |
| 4,955,702 | 9/1990 | Nakamura | 359/418 |
| 5,161,061 | 11/1992 | Ihara et al. | 359/708 |
| 5,299,067 | 3/1994 | Kutz et al. | 359/827 |
| 5,485,307 | 1/1996 | Kim | 359/421 |
| 5,491,589 | 2/1996 | Haymond | 359/895 |
| 5,561,555 | 10/1996 | Meier, Jr. et al. | 359/376 |

OTHER PUBLICATIONS

"Gleanings For ATM'S", R.F. Cox and R.W. Sinnott, Nov., 1976, Sky and Telescope, pp. 376–381.

Primary Examiner—Georgia Epps
Assistant Examiner—Ricky Mack
Attorney, Agent, or Firm—Bush, Riddle & Jackson L.L.P.

[57] ABSTRACT

An auxiliary lens attachment (22) for an optical device (10) is removably positioned between an eyepiece (12) and an objective lens (19). The auxiliary attachment (22) includes a cylindrical prescription lens (30) which corrects an astigmatism in the eye of the user. The auxiliary lens attachment (22) is rotated with the eyepiece (12) relative to the objective lens (19) for positioning the auxiliary attachment (22) at a precise rotational position relative to objection lens (19) for correction of the astigmatism.

6 Claims, 1 Drawing Sheet

AUXILIARY LENS ATTACHMENT FOR AN OPTICAL DEVICE

FIELD OF THE INVENTION

This invention relates to an auxiliary lens attachment for an optical device, and more particularly to such an auxiliary lens attachment removably positioned between an eyepiece and an objective lens of an optical device or instrument.

BACKGROUND OF THE INVENTION

A person with prescription glasses experiences difficulties in using an optical instrument such as a telescope, binocular, camera, gun field or microscope, etc. One problem is that a person's prescription glasses increase the distance between eyepieces in the optical instrument and the person's eye (or eyes) so that the person usually does not have the full field of view which is magnified from the optical instrument.

Astigmatism is a common eye defect and results from cylindrical error produced by an eccentrically shaped eye. Astigmatic eyes are characterized by refracting surfaces of unequal curvature, which prevent the focusing of light rays to a common point on the retina. Contact lenses and telescope optics are normally utilized to correct for spherical defects in the eye such as near or far sightedness. Correction of such defects is made by changing the focal length. The problem of astigmatism is not correctable by changing the focal length of an optical device, such as a telescope. Correction is obtained by a lens which embodies a combination of spherical and cylindrical curvatures for a particular astigmatism. An eyepiece of an optical instrument could be modified by adding or changing a corrective lens to the front of the eye element or lens itself to compensate for the cylindrical error of the eye of a particular user. However, such an eyepiece would be usable only by a particular individual for which the eyepiece is designed; and the eye relief (distance between the eyepiece and the eye) would be reduced by the thickness of such astigmatic correcting lens.

People who wear eyeglasses often like to remove them when looking through a telescope. This permits placing the pupil of the eye close to the ocular, at the telescope's exit pupil where observing is most comfortable. The exit pupil often lies quite close to eyepieces of short focal length. Even with longer-focus oculars, the "eye relief" may not be enough for the glasses wearer.

Near sighted or farsighted individuals can simply remove their glasses and refocus the telescope, letting it gather light and correct their vision at the same time. But most people with near or far sightedness also have astigmatism. For persons with considerable astigmatism, removing glasses causes an image degradation that refocusing the telescope cannot remedy.

An object of the present invention is to provide an astigmatism correction attachment for an optical device or instrument such as a telescope, microscope, binoculars, fire arm sighting device, or similar device which reduces the avoidable distance between the eye and the eyepiece for a user who requires astigmatism correction.

SUMMER OF THE INVENTION

The present invention is particularly directed to an astigmatism correction attachment for an optical device that is removably positioned between a rotatable eyepiece and a fixed objective lens of the optical device. The astigmatism correction attachment includes a cylindrical prescription lens for correcting astigmatism of the user, and an outer generally cylindrical holder mounting the cylindrical prescription lens. The holder has male threads on one end for threading within the rotatable eyepiece and female threads on the opposite end for threading other optical attachments.

The holder is mounted for rotation with the eyepiece so that rotation of the eyepiece simultaneously rotates or turns the cylindrical lens relative to the eye. Indicia such as scribe marks on the cylindrical lens indicate the rotational position of the cylindrical lens so that the cylindrical lens may be rotated to a predetermined position with respect to the user's eye in order to correct for astigmatism of the user's eye. The shape of the cylindrical lens is especially ground to the compensate for the user's astigmatism from near zero to about five diopters. Appropriate rotation of the cylindrical lens provides correction of the user's astigmatism in various optical devices, such as a spotting scope, microscope, telescope, or firearm scope, for examples.

As a result of the present invention, a user of the optical device such as a telescope can use the telescope without glasses. The pupil of the eye can be positioned close to the eyepiece so that viewing is comfortable to the user. Also, since almost all light entering the telescope exits through the telescope eyepiece to the pupil of the eye, the entire field of view is observed.

Other objects, features, and advantages of this invention will be apparent from the following specification and drawings.

DESCRIPTION OF THE INVENTION

Figure 1:
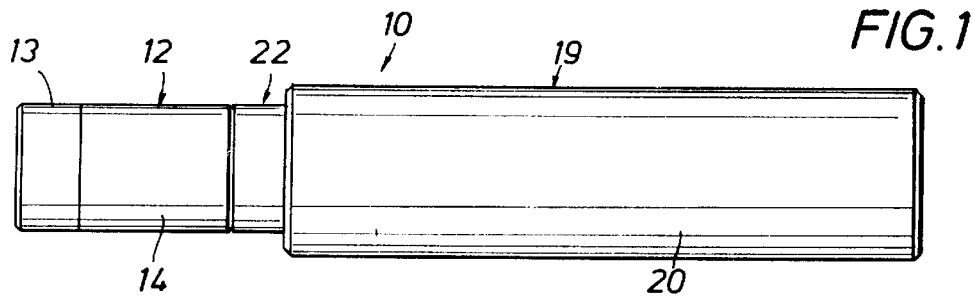
FIG. 1 is an elevational view of an optical device including the auxiliary lens attachment of present invention positioned between the eyepiece and objective lens of a telescope.
Figure 2:
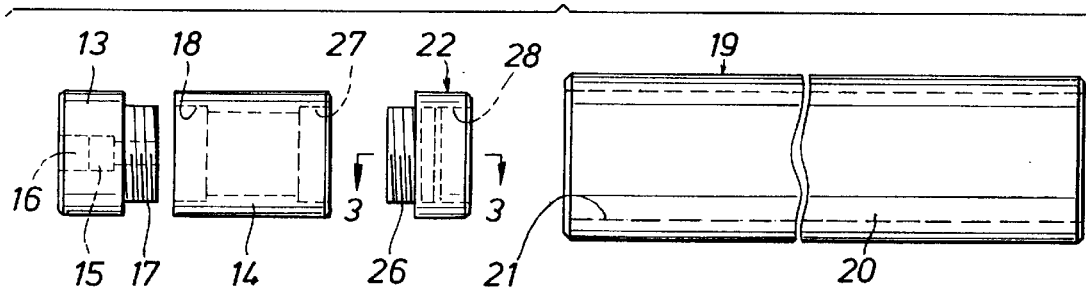
FIG. 2 is an exploded view of the optical device shown in FIG. 1 showing the auxiliary lens attachment detached from the eyepiece and objective lens.

Referring now to the drawings, an optical device 10 is a preferred embodiment of the present invention in the form of a telescope. Telescope 10 includes an eyepiece generally indicated at 12 having a cylindrical barrel 14. Eyepiece 12 includes an end lens holder 13 having a glass lens 15 mounted therein. A small diameter aperture 16 is provided in holder 13. The eye of a user is normally placed in close proximity to the end of eyepiece 12. Holder 13 has male threads 17 which engage female threads 18 of barrel 14. An objective lens is generally indicated at 19 and includes a tube having a female sleeve 21. A suitable objective lens is mounted within tube 20.

Figure 3:
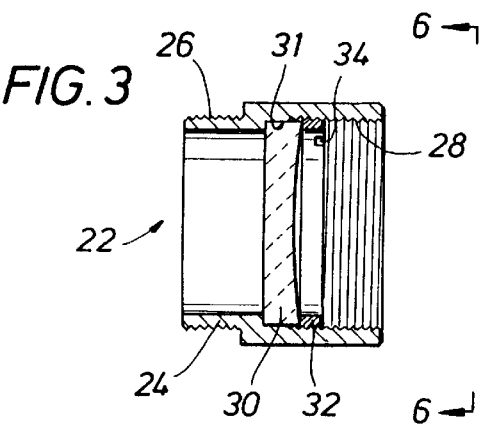
FIG. 3 is a section taken along line 3—3 of FIG. 2 showing the auxiliary lens attachment.

An auxiliary lens attachment generally indicated at 22 is mounted between eyepiece 12 and objective lens 19. Auxiliary attachment 22 as shown particularly in FIG. 3 includes an outer ring or holder 24 preferably made of a metallic material, such as aluminum. One end of lens attachment 22 includes external male threads 26. Internal female threads 28 are provided on the opposed end of attachment 22. Lens attachment 22 includes a prescription lens indicated generally at 30 which is mounted within an annular recess or groove 31 in cylindrical ring 24. An annular retainer 32 fits against lens 30 within groove 31. Male threads 26 are designed and arranged for engaging mating female threads 27 in eyepiece 12. Female threads 28 are designed and arranged for accepting another optical attachment if desired. Eyepiece 12 and lens attachment 22 together slide into sleeve 21 of objective lens assembly 19. Friction maintains eyepiece 12 and attachment 22 within sleeve 21. Alternatively, a set screw may be provided to maintain eyepiece 12/attachment 22 within sleeve 21.

Figure 6:
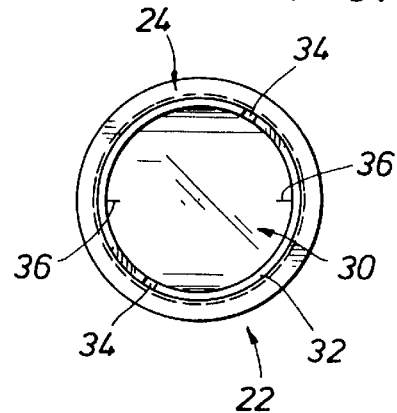
FIG. 6 is a front elevation looking generally along line 6—6 of FIG. 3.
Figure 4:
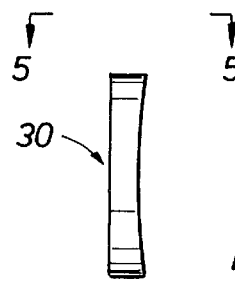
FIG. 4 is an elevation of the ground cylindrical prescription lens in accordance with the present invention.
Figure 5:
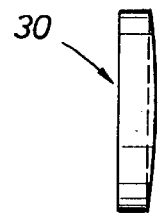
FIG. 5 is a top plan looking generally along line 5—5 of FIG. 4.

Prescription lens 30 as shown in FIGS. 4-6 is formed of optical glass (or other material) which has been ground with cylindrical surfaces to correct the astigmatism of the user of telescope 10. The diopter correction for astigmatism may be from near zero to about five of the cylindrical curve for lens 30. An optical crown glass that has been found to be satisfactory has an index of refraction of about 1.523. Prescription lens 30 has a pair of opposed scribe marks 34 therein. The adjacent annular retainer 32 has a pair of notches 36 therein to receive a suitable tool for tightening of retainer 32. Attachment 22, when threaded within eyepiece 12, is adapted for rotation with eyepiece 12 relative to the fixed objective lens 19 because of its friction fit within sleeve 21. Scribe marks 34 provide an indication of the rotational position of auxiliary attachment 22 relative to objective lens 19 so that the cylindrical lens 30 may be placed at a predetermined position relative to the fixed objective lens 19 for correcting the astigmatism of the user's eye by the cylindrical lens 30. The shape of cylindrical lens 30 is especially ground to the correction of the user's astigmatism. Thus, the axis of the prescription lens 30 is rotated to match the axis of the eye for correcting the astigmatism.

Auxiliary lens attachment 22 is connected between eyepiece 12 and objective lens 19 in the same manner as a filter and thus may be removed as desired. Another auxiliary lens attachment may be provided for another astigmatism correction lens for another user of the telescope. Since the auxiliary lens attachment 22 is positioned between eyepiece 12 and objective lens 19, the user does not have to wear glasses to use the telescope 10 because the prescription cylindrical lens 30 corrects the astigmatism of the user. Thus, the eye of the user can be placed in close proximity to the end of the eyepiece 12 for visually observing the field in view and to permit placing the pupil of the eye close to the eyepiece where observation is most comfortable. All light entering the telescope exits through the pupil of the eye, and thus the eye placed on the eyepiece can see the whole field of view at once.

While a preferred embodiment of the present invention has been illustrated in detail, it is apparent that modifications and adaptations of the preferred embodiment will occur to those skilled in the art. However, it is to be expressly understood that such modifications and adaptations are in the spirit and scope of the present invention as set forth in the following claims.

What is claimed is:

1. An auxiliary lens attachment which is arranged and designed to be removably positioned between an eyepiece and an objective lens assembly of an optical instrument, with said eyepiece having a lens disposed at its viewing end and having a coupling end, and with said objective lens assembly having an objective lens mounted within a tube, said auxiliary lens attachment comprising:

a cylindrical prescription lens for correcting an astigmatism of the user; and an outer cylindrical holder for mounting said prescription lens, said holder having a threaded connection at one end thereof for threading onto said eyepiece and an outer surface for insertion into said tube of said objective lens assembly of said optical instrument, wherein said holder and said eyepiece when secured together are rotated in said tube relative to said objective lens, and means are provided to indicate the rotational position of said holder and said cylindrical prescription lens mounted therein for accurate rotational alignment of said prescription lens relative to said objective lens for correction of said astigmatism.

2. An optical assembly for correcting the astigmatism of an eye of a user comprising:

an objective lens assembly including an objective lens mounted within a tube;

an eyepiece including a lens carried by said objective lens assembly for rotation relative to said objective lens; and an auxiliary lens attachment removably secured to said eyepiece and positioned between said lens of said eyepiece and said objective lens, said auxiliary lens attachment including a cylindrical prescription lens for correcting astigmatism, and an outer cylindrical holder for mounting said prescription lens, said holder having a threaded connection at one end thereof for threading onto said eyepiece and a surface at its other end arranged and designed for rotatable coupling with said objective lens, whereby said auxiliary lens attachment and said eyepiece are rotatable with respect to said objective lens, wherein an indicium is positioned on said cylindrical prescription lens to indicate the rotational position of said cylindrical prescription lens with respect to said objective lens for accurate rotational alignment of said prescription lens with said objective lens for repeatable use of said eyepiece correction of said astigmatism.

3. An optical instrument comprising, an objective lens assembly having an objective lens mounted within a tube, an eyepiece having first and second ends, with an eyepiece lens mounted at a first end and with a prescription lens mounted at said second end, said second end of said eyepiece being slidingly inserted within and rotatably carried by said tube of said objective lens assembly.

4. The optical instrument of claim 3 wherein said prescription lens is a cylindrical lens for correcting astigmatism of the user, said cylindrical lens being placed between said objective lens and said eyepiece lens.

5. The optical instrument of claim,4 wherein an indicium is positioned on said cylindrical prescription lens to assess the amount of relative rotation between said eyepiece and said objective lens as an aid to the user in obtaining astigmatism correction.

6. The optical instrument of claim 3 wherein said prescription lens is mounted in a cylindrical holder which is releasably fastened to said second end of said eyepiece and said holder of said eyepiece is slidingly inserted and rotatable within said tube of said objective lens assembly.

* * * * *